United States Patent
Flynn et al.

(10) Patent No.: US 10,209,755 B2
(45) Date of Patent: Feb. 19, 2019

(54) NO-OPERATION POWER STATE COMMAND

(71) Applicant: ARM Limited, Cambridge (GB)

(72) Inventors: David Walter Flynn, Cambridge (GB); Vasan Venkataraman, Ft. Lauderdale, FL (US)

(73) Assignee: ARM Limited, Cambridge (GB)

( * ) Notice: Subject to any disclaimer, the term of this patent is extended or adjusted under 35 U.S.C. 154(b) by 196 days.

(21) Appl. No.: 15/419,293

(22) Filed: Jan. 30, 2017

(65) Prior Publication Data

US 2018/0217648 A1 Aug. 2, 2018

(51) Int. Cl.
  *G06F 1/22* (2006.01)
  *G06F 1/32* (2006.01)
  *H04W 52/02* (2009.01)
  *G06F 1/26* (2006.01)

(52) U.S. Cl.
  CPC ............ *G06F 1/266* (2013.01); *G06F 1/3287* (2013.01); *G06F 1/3296* (2013.01); *H04W 52/0209* (2013.01)

(58) Field of Classification Search
  CPC ...... G06F 1/226; G06F 1/3287; G06F 1/3296; H04W 52/0209
  See application file for complete search history.

(56) References Cited

U.S. PATENT DOCUMENTS

| | | | | |
|---|---|---|---|---|
| 5,247,657 A * | 9/1993 | Myers | ................. | G06F 13/4291 709/208 |
| 7,633,965 B2 * | 12/2009 | Shibata | ............. | H04L 12/40032 370/463 |
| 8,090,966 B2 * | 1/2012 | Chen | ..................... | G06F 1/3203 713/300 |
| 9,190,989 B1 * | 11/2015 | Sharda | .................. | G06F 1/3293 |
| 2008/0191331 A1 | 8/2008 | Lee et al. | | |
| 2009/0172429 A1 | 7/2009 | Rachakonda | | |
| 2016/0259702 A1 | 9/2016 | Mishra et al. | | |

FOREIGN PATENT DOCUMENTS

GB  2539443  12/2016

OTHER PUBLICATIONS

International Search Report and Written Opinion of the International Searching Authority dated Mar. 1, 2018 in PCT/GB2017/053660, 16 pages.

* cited by examiner

*Primary Examiner* — Stefan Stoynov
(74) *Attorney, Agent, or Firm* — Nixon & Vanderhye P.C.

(57) ABSTRACT

A system comprises a first domain 4 and second domain 6 which communicate via an interface 8. The first domain 4 transmits power state commands to the second domain 6 for controlling transitions of power states at the second domain 6. The power state commands include at least a power up command 50 for triggering a transition to a power up state and a power no-operation command 52 in response to which the second domain remains in the current one of the power states. The no-operation command 52 enables the second domain 6 to be left in either the power up state or a different power state even if the first domain 4 is powered down.

20 Claims, 10 Drawing Sheets

NO-OPERATION POWER STATE COMMAND

BACKGROUND

Technical Field

The present technique relates to control of power states in a system having a first domain and a second domain.

Technical Background

An electronic system may comprise a number of domains which may operate in different power states. When communicating between domains it can be useful to allow a first domain to influence the power state in a second domain so that the first domain can ensure that if it transmits data to the second domain then that data will not be lost due to the second domain being in an inappropriate power state.

SUMMARY

At least some examples provide a system comprising:
a first domain;
a second domain; and
an interface to communicate between the first domain and the second domain;
wherein the first domain is configured to transmit power state commands to the second domain over the interface, for controlling transitions of the second domain between a plurality of power states including at least a power up state;
in response to a power up command transmitted by the first domain over the interface, the second domain is configured to transition to the power up state; and
in response to a no-operation command transmitted by the first domain over the interface, the second domain is configured to remain in a current one of said plurality of power states.

At least some examples provide a first domain for transmitting, over an interface, power state commands for controlling transitions of a second domain between a plurality of power states including at least a power up state;
the first domain comprising control circuitry to:
control transmission of a power up command over the interface to control the second domain to transition to the power up state; and
control transmission of a no-operation command over the interface to control the second domain to remain in a current one of said plurality of power states.

At least some examples provide a second domain comprising:
control circuitry to control transitions of the second domain between a plurality of power states in response to power state commands received from a first domain over an interface, the plurality of power states including at least a power up state;
wherein in response to a power up command transmitted by the first domain over the interface, the control circuitry is configured to control the second domain to transition to the power up state; and
in response to a no-operation command transmitted by the first domain over the interface, the control circuitry is configured to control the second domain to remain in a current one of said plurality of power states.

At least some examples provide a method comprising:
transmitting power state commands over an interface from a first domain to a second domain; and
controlling transitions of the second domain between a plurality of power states including at least a power up state, in dependence on the power state commands;
wherein in response to a power up command transmitted by the first domain over the interface, the second domain transitions to the power up state; and
in response to a no-operation command transmitted by the first domain over the interface, the second domain remains in a current one of said plurality of power states.

Further aspects, features and advantages of the present technique will be apparent from the following description of examples, which is to be read in conjunction with the accompanying drawings.

DESCRIPTION OF EXAMPLES

A system comprises a first domain and a second domain. The first and second domains could be entirely separate devices, or could be different regions within the same device, e.g. different power or clock domains with separate power or clock supplies. Alternatively, the domains could share a common power or clock supply, but have separate power gating or clock gating control to provide autonomous control of the power states in each domain. An interface is provided to communicate between the first domain and the second domain. The first domain may transmit power state commands to the second domain over the interface, for controlling transitions of the second domain between a number of power states including at least a power up state. The interface could also be used for exchanging other information (or alternatively, another interface may be provided for communicating other information between the first domain and the second domain, separate from the interface used from power state commands).

In the technique discussed below, in addition to a power up command transmitted by the first domain over the interface to control the second domain to transition to the power up state, the power state commands also include a no-operation command which when transmitted by the first domain instructs the second domain to remain in the power state in which it is already operating. One may question the usefulness of a no-operation command which does not actually trigger any transition to a specific state, but merely instructs the second domain to remain in its current state. If the first domain wishes the second domain to operate in a given state, then why does it not simply issue a command specifying the required state? However, this approach would assume that the first domain itself will always be powered on, so that it can hold the power state command at the required value for the desired power state, and increasingly there are a number of applications where it may be desirable for both the first domain and the second domain to have their power states controlled autonomously so that it is possible for one or other of the first domain or the second domain to be powered down independently of whether the other domain is powered. One approach could be to provide latching circuitry at the first domain to 'remember' the last command asserted on the interface before powering down the first domain, and clamping the signal lines to that previous value when the first domain is powered down, so that the second domain can be maintained in different power states when the first domain is powered down. However, the latch circuitry for retaining and asserting the previous command is typically a non-standard circuit which is not available in many standard cell libraries used for automated design of integrated circuits, so can increase development and manufacturing costs. Also, such latches can be subject to noise, which may cause a bistable circuit to flip state leading to the wrong power state at the second domain. By instead providing an explicit no-operation command which can instruct the second domain to remain in its current state regardless of what that state was, this avoids the need for the first domain to remember the last asserted command when it is powered down, reducing the cost of implementing the power command interface and associated control circuitry between the first and second domains in scenarios where both the first and second domains may be autonomously powered down even when the other domain is operational.

The first domain may defer transmission of a subsequent power state command to the second domain until a previous power state command has been acknowledged by the second domain. This prevents the first domain changing the commands faster than can be registered by the second domain. The acknowledgement sent from the second domain to the first domain could have various forms, for example assertion of an acknowledge signal, or toggling of the state of an acknowledge signal.

In addition to the power up command and no-operation command, in some examples the power state commands may also include a power down command which can be used by the first domain to trigger the second domain to transition to a power down state. In general the power up state and power down state may be any power states which vary in terms of the level of power consumed by the second domain, with the power up state having greater power consumption than the power down state. For example, in the power down state at least some portions of the second domain could be power gated or have their clocks deactivated to reduce power consumption. Alternatively the power down state may be a full shutdown mode in which the power to the entire second domain is fully off. It will be appreciated that some embodiments may have more than two different power states for the second domain, e.g. with different levels of granularity in trading off power savings against the functionality available and/or the delay in restoring the system to full operation. Where a power down command is provided, this can enable lower power consumption in the system as a whole, since when the first domain has finished communicating with the second domain it may provide the power down command which may then trigger the second domain to switch to the power down state to save power. However, it is not essential to provide a power down command, and in other embodiments while the first domain may be able to issue a power up command to force the second domain to enter the power up state if the first domain needs to communicate with it, it may not have the ability to trigger a power down. Instead, the second domain may remain in the power up state until another event occurs, such as a system reset or timeout after a period of inactivity, which may be independent of the control provided by the first domain.

The no-operation command can be useful for a number of purposes. For example, the first domain may transmit the no-operation command when in a power down state. Clamping circuitry may be provided to clamp a subset of signal paths of the interface used for transmitting the power state commands to a predetermined value corresponding to the no-operation command. This ensures that whenever the first domain is powered down, the power state signal paths on the interface do not influence the second domain so that the second domain can continue to remain in the relevant state it was put in before the first domain powered down, without requiring any latching of previous values at the first domain. For example, if the no-operation command is represented using a value comprising all zero bits, then the clamping circuitry could comprise circuitry for clamping the signals on the relevant signal paths low (e.g. a set of AND gates for which one of the inputs is a signal which is driven low when the first domain enters the power down state). Other embodiments may clamp the signals on some signal paths high, depending on the encoding of 1 s and 0 s used for the no-operation command.

In another example, the no-operation command may be used as an intermediate command between a power up command and a power down command. Some embodiments may use a command protocol for which any valid sequence of two successive commands has a Hamming distance of 1 between the encodings of the two commands (that is, a single bit changes state between the two successive commands). For example, the no-operation command could be encoded as a value for which all bit values are 0 or all bit values are 1, and the power up and power down commands could be one hot or one cold encoded signals, for which exactly one bit is 1 or 0. Hence, by issuing the no-operation command between a power up command and a power down command, this ensures each transition only changes one bit of the encoding, to reduce the chance of signalling errors which could otherwise be caused by the second domain sampling the command during a command transition at a moment in time when one bit has changed state but another bit has not yet changed state. By ensuring that successive commands issued by the first domain have a Hamming distance of one between them, it is not possible for the second domain to sample an unintended intermediate value as only one bit changes and so the only commands that are possible to sample are the previous command and the next command.

The first domain may not be the only circuitry able to control the power state of the second domain. There may also be a second domain power controller which triggers the second domain to operate in a power up state if a first predetermined event occurs, independent of the power state commands transmitted from the first domain. For example the first predetermined event may be the elapse of a given number of cycles of a clock signal, or the receipt of a signal from an external device by the second domain. Hence, the second domain power controller provides some autonomous level of control over the second domain which is separate from the first domain, and so there may be a desire for the second domain to be powered up even if the first domain is powered down. The no-operation power state command makes the interface more efficient in such a scenario.

Similarly a first domain power controller may be provided to trigger transitioning of the first domain to a power down state independent of a current power state of a second domain. Also the first domain power controller may trigger the first domain to transition to a power up state if a second predetermined event occurs. The second predetermined event could be the elapse of a given number of cycles of a clock signal, or receipt of a first domain wake up signal from the second domain for example. The first domain wake up signal could be transmitted by the second domain for example if data is received from an external device which needs to be processed in the first domain, to trigger a wakeup if the first domain is currently powered down.

Since the no-operation command requests the second domain to remain in its current state, it can correspond to different power states of the second domain depending on the previous state of the second domain. If the no-operation command is received when the second domain is currently in the power up state, the second domain remains in the power up state. If the no-operation command is received when the second domain is currently in a power down state, the second domain remains in the power down state. Hence, the same encoding of the no-operation command can correspond to two different states at the second domain, which allows the first domain to be powered down clamping the power command interface to a fixed value while permitting the second domain to remain in any power state. In contrast, in a protocol where each power state of the second domain has to be explicitly instructed by the first domain, this would not be possible. Hence, the power up and down commands issued by the first domain can be regarded as state transition commands which request transitions between power states, rather than commands directly specifying the state in which the second domain is to operate, and following the transmission of a given state transition command, the power state may remain in the newly instructed state even if the power state command subsequently transitions to the no-operation command.

In general the no-operation command may be any command having a different encoding to the power up command. For example, the power up command and no-operation command may be represented as bit 1 and bit 0 respectively, or vice versa.

In embodiments where there is also a power down command, the no-operation command may also have a different encoding to the power down command. Hence, with three or more different types of power state command, the power state commands may each be encoded as an N-bit signal, where N is an integer greater than or equal to two. The N bits of the power state command could be transmitted serially or in parallel. The examples below show parallel signal paths used to transmit the respective bits of the power state commands, but it would also be possible to transmit each bit serially over a single path, or use a mixed serial/parallel approach where some bits of the power state commands are transmitted in parallel but several series transmissions are required to transmit all the bits. The total number of bits N in each power state command may depend on the number of power states implemented at the second domain, and on whether any other information is included in the commands.

In some examples, the first domain may transmit at least one bit of information to the second domain using a subset of signal paths of the interface used for transmitting the power state commands. This can reduce the number of further signal paths required for transmitting the information and power state commands. For example, if a given protocol provides three different power state commands (the power up, power down and no-operation commands discussed above), then there would typically be a spare fourth encoding for a two-bit value used to represent the commands, which can be exploited for transmitting information. For example, the spare encoding could be used as an information signalling prefix command. While one would expect that with one spare encoding it is still not possible to transmit useful information, since one would need at least two values to represent the different bit values of a binary value, in fact the spare encoding can be used as an information signalling prefix command which modifies the behaviour of subsequent power state commands transmitted by the first domain, so that the bits of information can be transmitted to the second domain on the same signal paths used for the power state commands.

Hence, in response to receipt of the information signalling prefix command following receipt of a power up command, the second domain may then interpret one or more following power state commands received from the first domain as representing at least one bit of information, instead of triggering transitions between the power states in response to those one or more power state commands. The one or more following power state commands may be those power state commands received between receipt of the information signalling prefix command and receipt of a subsequent no-operation command. For example the power up command and power down command may be assigned to represent bit values of 1 and 0 respectively (or vice versa) and so a sequence of power up and power down commands provided after the information signalling prefix command can be used to signal a binary value to be transmitted, with a no-operation command then terminating the chain of bits to be transmitted.

The present technique can be used in a wide range of systems, but one example where it can be useful is where the first domain comprises a host system and the second domain comprises a wireless subsystem to control wireless communication between the host system and an external device. In this case both the host system and the wireless subsystem may be required to be controlled autonomously since even if the host system is in a power down state, the wireless subsystem may need to be woken up periodically to check for data received from external devices, while also the host system may provide processing functionality even if the wireless subsystem is not currently being used. A system-wide power-on-reset may initialise the domain power states (for example the wireless subsystem may be initialised "off" and the host system initialised "on"), and subsequent power state commands from the host system can request corresponding transitions in the power state (or no-change for the no-operation command). By using the no-operation command this enables the second domain power state to be maintained regardless of whether the first domain is powered.

Figure 1:
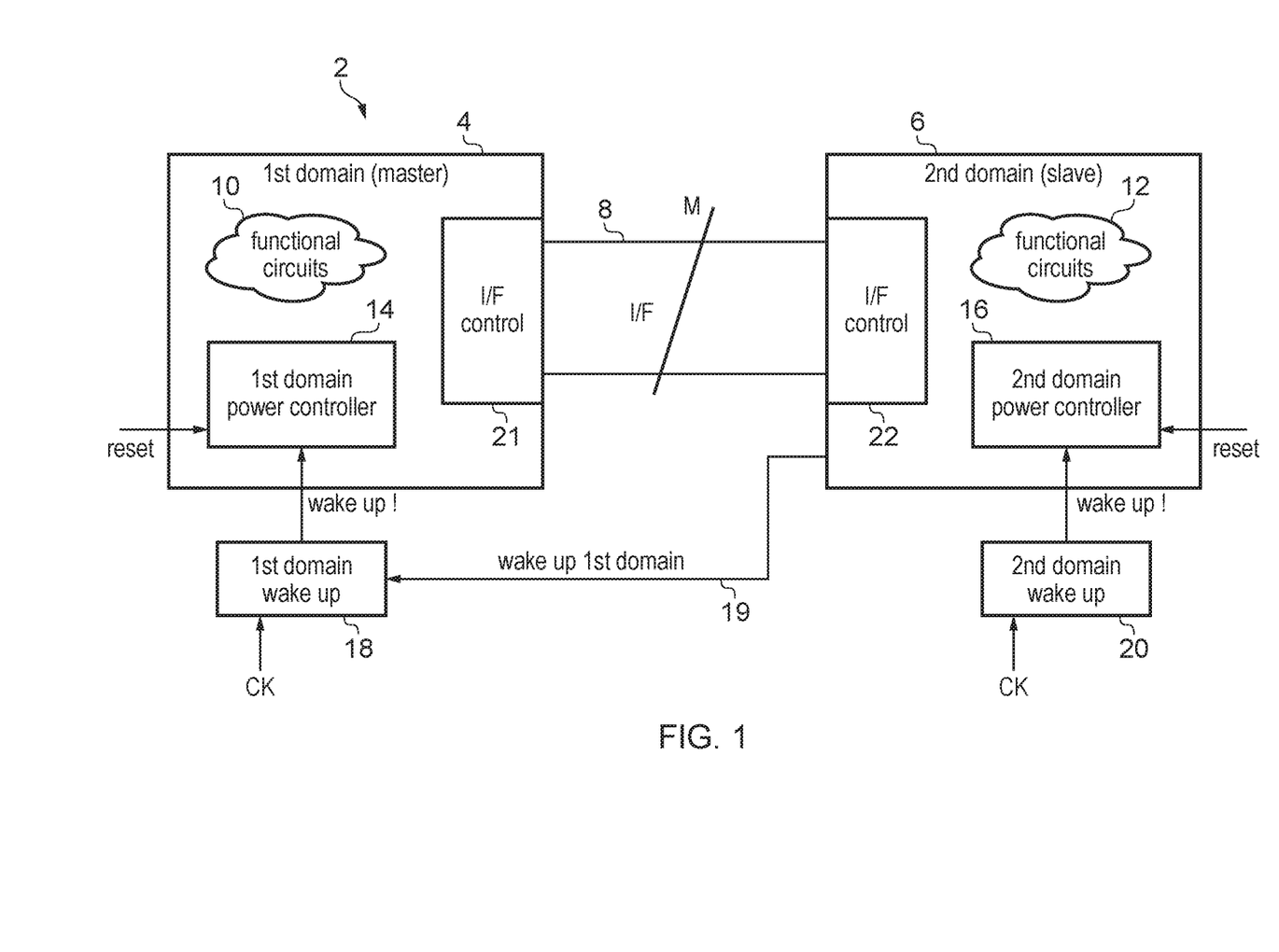
FIG. 1 schematically illustrates an example of a system comprising a first domain and a second domain and an interface for passing power state commands from the first domain to the second domain.

FIG. 1 schematically illustrates an example of a system 2 which includes a first domain 4 and second domain 6 communicating over an interface 8. The interface may comprise signal paths for transmitting a certain number of bits M, including bits passing in either direction, but at least include some signal paths used for transmitting power state commands from the first domain 4 to the second domain 6 to influence power states of the second domain 6. Each domain has a certain group of functional circuits 10, 12 which implement the functionality of the relevant domain. For example the functional circuits could include at least one processor, memory, memory controller, peripheral input/output controller, or communication unit for communicating with external devices. The particular type of functional circuitry 10, 12 included in each domain is dependent on the particular implementation. Similarly, the purposes of the first and second domains may vary considerably from application to application. In general the first and second domains can be different regions within an integrated circuit or system on-chip, different integrated circuits or system on-chip, or entirely separate electronic devices. The interface 8 can be a wired interface or a wireless interface.

Each of the domains has a respective power controller 14, 16 which controls the power state of the corresponding domain autonomously from the other domain. In some cases the two domains may have different sets of power states available, but in the subsequent examples for ease of explanation we shall assume that both domains use the same set of power states. The different power states may vary in any way which enables different levels of power consumption within the corresponding domain, which could be achieved for example by reducing the frequency of a clock signal or shutting the clock signal off altogether, by power gating certain blocks or regions of the domain, or any other known power saving technique. The power states could also differ in terms of state retention, with higher power states retaining more state information than lower power states. Each of the domains has a wakeup controller 18, 20 which remains powered when the corresponding domain is in the power down state, and issues an interrupt to the corresponding domain's power controller 14, 16 in response to the certain predetermined events. For example each of the wakeup controllers 18, 20 may receive a clock signal and the wakeup controllers 18, 20 may be programmed to issue an interrupt after elapse of a certain number of cycles of the clock. For the wakeup controller 18 associated with the first domain, a wakeup interrupt may also be triggered in response to a wakeup signal 19 issued by the second domain when the second domain 6 needs to communicate with the first domain 4. At least the portion of the power controller 14, 16 for detecting the wakeup interrupt remains powered when the corresponding domain is powered down, and the detected interrupt triggers the power controller 14, 16 to switch the domain to a power up state. Each power controller 14, 16 may also receive a reset signal which triggers the power controller to switch the corresponding domain to a power down mode.

Each domain also has an interface control circuit 21, 22 which is used for controlling information on the interface 8. The first domain's interface control circuitry 21 generates power state commands to be transmitted to the second domain 6, while the second domain's interface control circuitry 22 receives the commands and controls the power controller 16 in dependence on those commands. The interface control circuitry 21, 22 may also be responsible for implementing any handshaking mechanism for transmitting and acknowledging signals over the interface, and for encoding or decoding of information transmitted over the interface. For ease of explanation the subsequent examples describe a one-way power control mechanism, where the first domain 4 can send power state commands to the second domain 6 in order to control the power state in the second domain, but the second domain does not have the ability to control the power state in the first domain (other than by issuing the wakeup signal 19 which is independent of the power control interface 8). Hence, in the examples below the first domain is assumed to have the transmitting functionality for generating the power state control commands and the second domain is assumed to have the receiving functionality for responding to the power state control commands. However, it will be appreciated that it would also be possible to implement a symmetric power control interface where both domains 4, 6 can issue power state commands to the other domain in the way discussed below, and in this case both interface control circuits 21, 22 would have both the command transmitting and receiving functionality.

Figure 2:
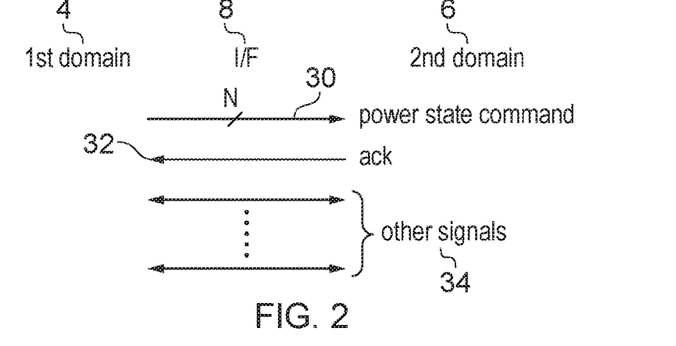
FIG. 2 shows an example of signals transmitted on the interface.

FIG. 2 shows an example of signals exchanged on the interface 8. The interface includes an N-bit signal 30 for transmitting power state commands from the first domain to the second domain. While N could be one bit, in the second or third embodiments discussed below N is at least two bits. The interface also includes an acknowledgement signal path 32 for the second domain 6 to transmit an acknowledgement of a power state command to the first domain 4. The interface may also include a number of other signal paths 34 used for transmitting other information between the domains. For example, these may be used for the communication between the first and second domains required to carry out whatever functionality is required for the functional circuits. The power state command and acknowledgement paths 30, 32 supplement these signals to provide power control, so that when the first domain needs to transmit data to the second domain, it can ensure that the second domain is already in a power up state ready to receive that information before it starts transmission.

Figure 3:
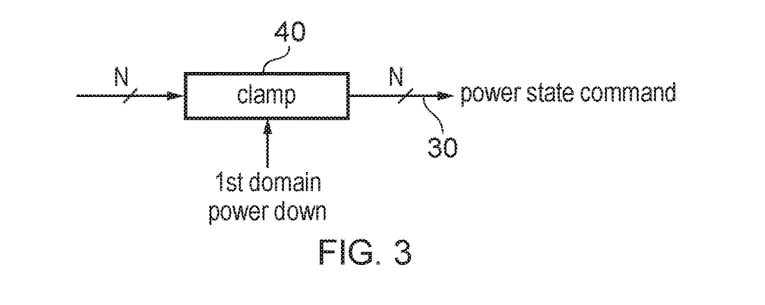
FIG. 3 shows an example of clamping the power state command to a predetermined value when the first domain is in a power down state.

FIG. 3 shows an example of clamping circuitry 40 provided to clamp the power state command signal path 30 to a predetermined value when the first domain 4 is placed in a power down state. For example the clamping circuitry 40 may include a number of AND gates which clamp each bit of the power state command signal path 30 to low (binary 0) signal values (in this case the value having all bits equal to 0 would be interpreted as representing the no-operation command). Alternatively the signal paths could be clamped high (binary 1), or with a mixture of high and low values, depending on the encoding of the no-operation command. Hence, when the first domain is powered down, the power state commands take the no-operation value which ensures that the first domain no longer influences the particular power state in which the second domain is operating. This allows the second domain to have some autonomous control of its power state even if the first domain is powered down.

Figure 4:
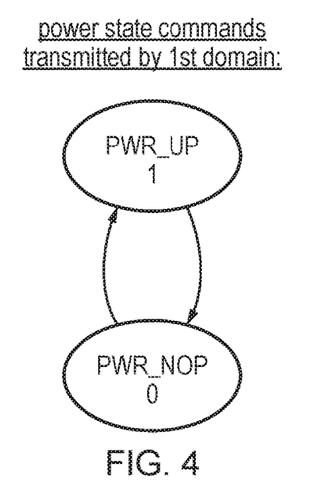
FIG. 4 shows power state commands transmitted by the first domain in a first embodiment.
Figure 5:
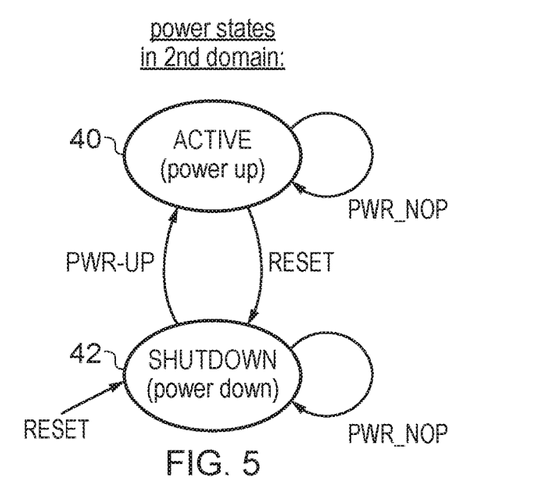
FIG. 5 is a state diagram showing corresponding transitions between power states in the second domain in response to the commands of the first embodiment.

FIGS. 4 and 5 illustrate a first embodiment of a power state command protocol. FIG. 4 illustrates the set of power state commands available to the first domain 4 in this embodiment. In this example the power state commands include a power up command represented with a bit value of 1 and a no-operation command represented by a bit value of 0. As the power state commands are represented by a single bit then by definition any transition between the commands changes only one bit and so has a Hamming distance of 1.

FIG. 5 shows a state diagram representing the power states in the second domain controlled in response to the power state commands. In this example the second domain can be in an active (power up) state 40 in which the second domain is fully operational or a shutdown (power down) state 42 in which the power to the second domain is turned at least partially off, e.g. by power gating or clock gating. On an initial system reset, the second domain is initialised in the shutdown state 42. A subsequent power up command from the first domain results in a transition to the active state 40. If a power no-operation command is received in either the active or the shutdown state, then the second domain remains in the same state it was at the time of receiving the power no-operation command. Hence the power no-operation command enables the second domain to be retained in either of the power states even if the first domain is powered down and without requiring any latching within the interface control circuitry 20 of the previously asserted command in order to allow the second domain to remain in the desired state. Once in power up state, a return to the power down state occurs in response to another reset operation. Hence, in this embodiment the first domain can request a power up of the second domain, but cannot control the second domain returning to the power down state.

Figure 6:
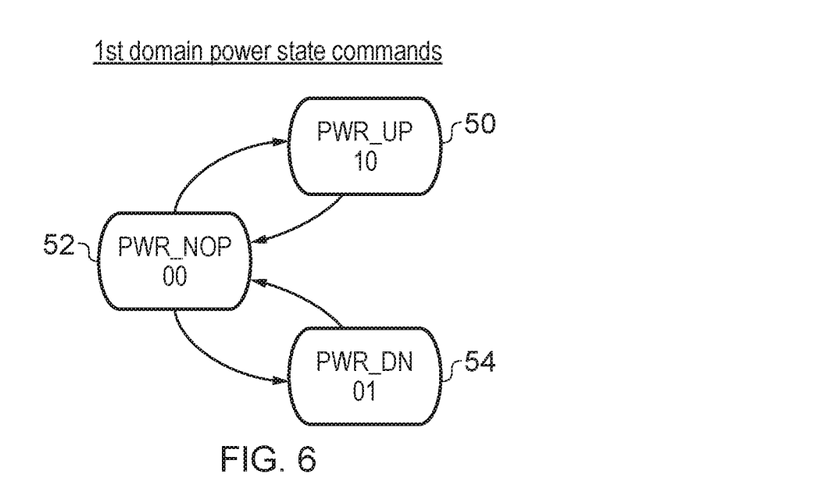
FIGS. 6 and 7 show two alternative representations of a state diagram showing valid sequences of power state commands transmitted by the first domain for a second embodiment.
Figure 7:
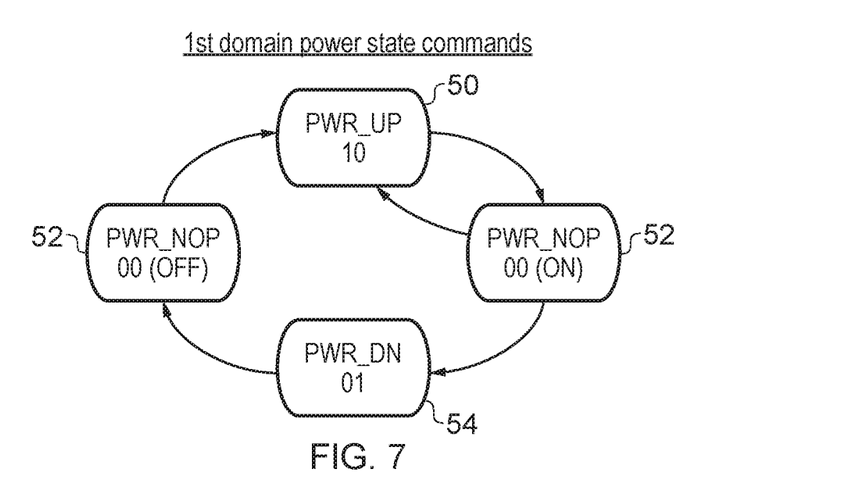
Figure 8:
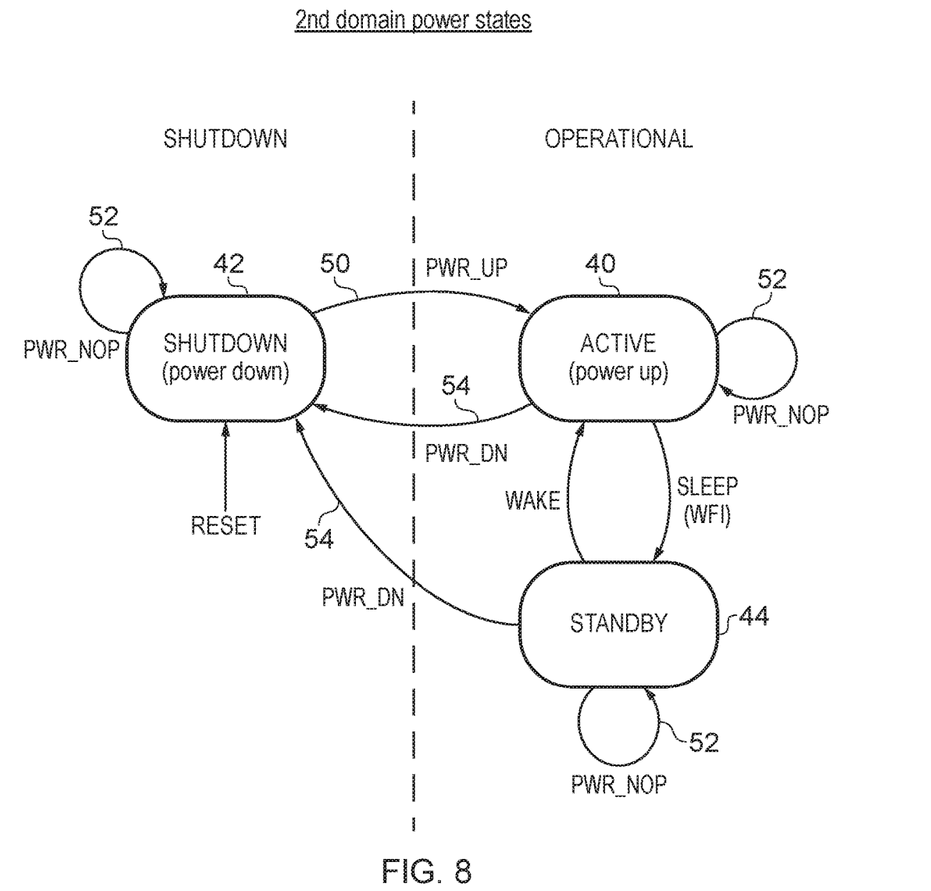
FIG. 8 is a state diagram showing transitions between power states in the second domain in response to power state commands according to the second embodiment.

FIGS. 6 to 8 show a second embodiment of a protocol. In this example, in addition to the power up command 50 and no-operation command 52, the first domain can also provide a power down command 54. FIG. 6 shows a state diagram illustrating valid sequences of commands which may be issued by the first domain 4. The encodings of the power up, no-operation and power down commands are 10, 00 and 01 respectively. Between issuing one of the power down and power up commands and the other of the power down and power up commands, the first domain is required to first switch to the no-operation command 52. Hence, it is not possible for the first domain to directly switch between the power up and power down commands 50, 54. This is enforced so that any valid transition between commands changes a single bit of the encoding, which makes the system less susceptible to errors as it is not possible for the second domain to sample an unintended intermediate command state for which only some of the bits have transitioned. That is, the Hamming distance between any valid sequence of two successive commands is 1.

FIG. 7 shows an alternative representation of the state diagram of FIG. 6 but with the duality of the power no-operation commands 52 illustrated explicitly. That is, since the no-operation command 52 can correspond to the second domain 6 being in either the power down state or the power up state, it is shown as two separate states in the first domain's command state diagram of FIG. 7. It is this duality which, by allowing a single encoding of a command to permit two or more different states at the second domain, enables a more efficient implementation of the interface between the first domain and the second domain as even when the first domain is powered down autonomously from the second domain, the second domain can still remain in different power states even though the command is clamped to a fixed value and the first domain does not have any means of remembering the previously asserted command.

FIG. 8 shows a state diagram illustrating transitions between the respective power states of the second domain in the second embodiment shown in FIGS. 6 and 7. In this example, in addition to the shutdown state 42 and active state 40, the second domain 6 also has a standby state 44 in which the second domain consumes less power than in the active state 40 but more power than in the shutdown state 42. For example, while the shutdown state 42 may be a fully off state in which all blocks of the second domain are powered down, the standby state 44 could have a subset of blocks power gated or could have the clock frequency reduced. In this example, a reset of the second domain switches the second domain into the shutdown state 42 regardless of which state the second domain was in prior to receiving the reset signal. A subsequent no-operation command received from the first domain while in shutdown state 42 would keep the second domain in the same power state. The power up command 50 from the first domain 4 triggers a transition of the second domain 6 from the shutdown state 42 to the active state 40. The power down command 54 triggers a transition from the active or standby states 40, 44 to the shutdown state 42. Transitions from the active state 40 to the standby state 44 may occur if a certain event occurs, for example detection that the second domain has been idle for at least a certain period of time. In the standby state, the second domain 6 waits for an interrupt from the wakeup controller 20 to signal a wakeup event. The wakeup interrupt may be triggered by the wakeup controller 20 in response to a timer expiring or an external device issuing an interrupt to the second domain, for example. The wakeup interrupt triggers the power controller 16 to switch the second domain 6 back to the active state 40. In any of the states shown in FIG. 8, receipt of the no-operation command 52 results in no change to the power state of the second domain 6. Hence, it can be seen from FIG. 8 that while the first domain 4 has some influence over the power state of the second domain through the use of the power up and power down commands, there are also other events which may trigger transitions of states autonomously, independent from the first domain.

Figure 9:
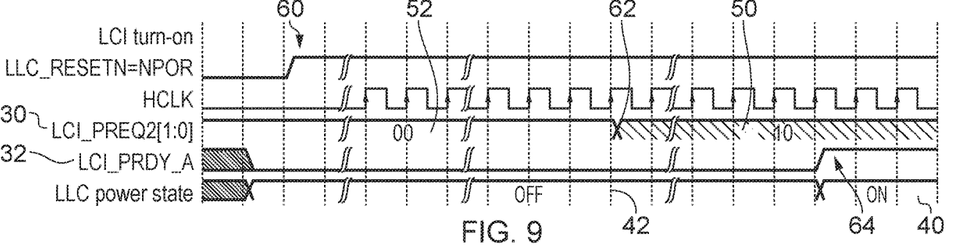
FIGS. 9, 10 and 11 show example sequencing wave forms for controlling the power state in the second domain based on the power state commands according to the second embodiment.

FIG. 9 is a waveform showing an example of power up sequencing for the second domain. At point 60 the reset signal is asserted and this causes the second domain to enter the shutdown state 42 in which its power is off. At this time the power state command sent from the first domain is currently 00 indicating the no-operation command 52. Sometime later at time 62 the first domain 4 determines that it needs to communicate with the second domain 6 and so switches the encoding of the power state command signal lines 30 to represent the power up command 50. The second domain 6 acknowledges the power up command at time 64, by toggling the state of the acknowledge signal 32, and switches its power state to the active (power on) state 40.

Figure 10:
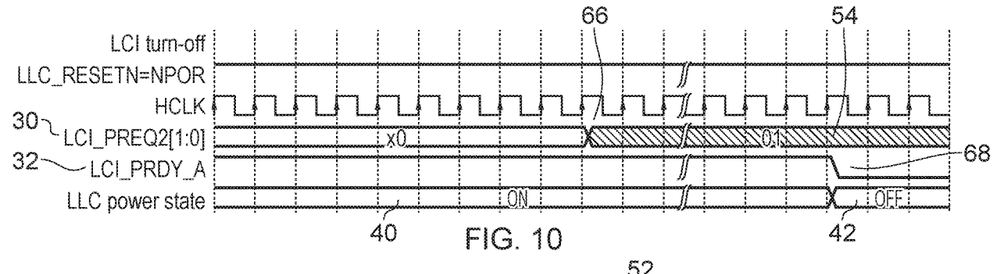

Similarly, FIG. 10 shows an example of a power down request and acknowledge sequence. This time the second domain 6 starts in the active state 40. At a time 66 the first domain issues the power down command 54 on the power state command signal lines 30, which is acknowledged by the second domain 6 toggling the state of the acknowledge signal line 32 at time 68. The power controller 60 in the second domain 6 controls the power supply or clock signals in the second domain to cause the second domain to enter the shutdown state 42.

Figure 11:
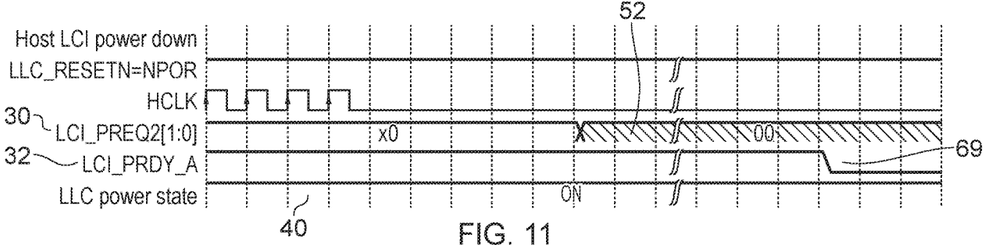

FIG. 11 shows an example sequencing waveform when the first domain 4 is turned off. In this example, the second domain is in the power up state, and the first domain asserts the no-operation command 52 on the power state command signal lines 30, which is acknowledged by the second domain by toggling the state of the acknowledge signal 32 at time 69. As the second domain was previously in the power up state, it continues to remain in the power up state following receipt of the no-operation command. On the other hand, if the second domain had been in the power down state when receiving the power no-operation command 52 then it would have stayed in the power down state. Hence, rather than responding directly to a request for entering a particular state for every possible value of the power state commands, some values trigger particular state transitions while the no-operation command can be used when the power state is to be left alone. This means that it is not necessary for the first domain to remember what state it was previously requesting at the point of being powered down which simplifies clamping within the interface control circuit 20.

Figure 12:
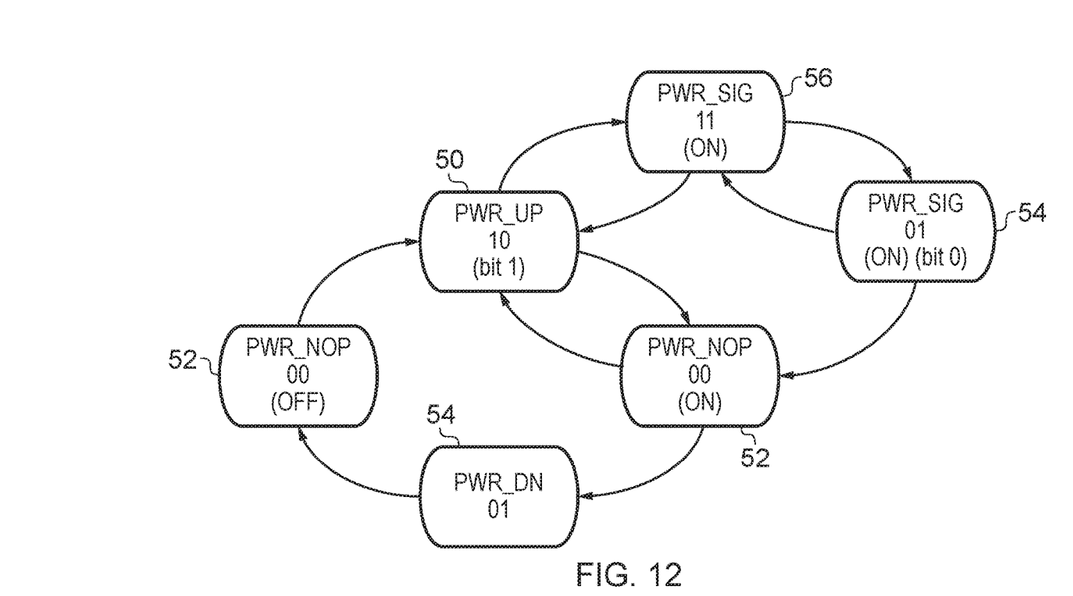
FIG. 12 is a state machine illustrating a third embodiment of power state commands transmitted by the first domain.
Figure 13:
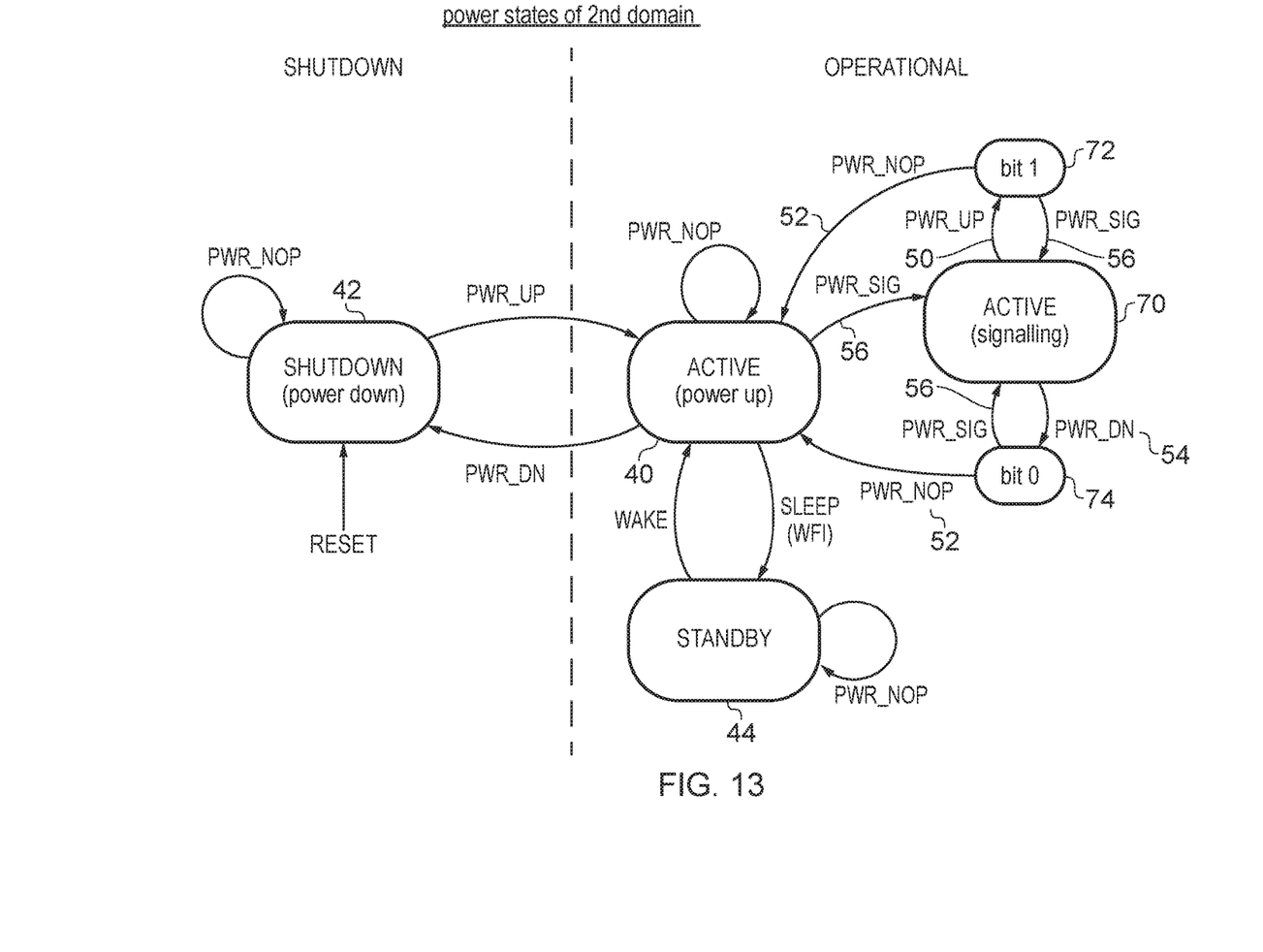
FIG. 13 is a corresponding state diagram showing transitions between power states of the second domain for the third embodiment.

FIGS. 12 and 13 show a third example protocol where the power state command lines 30 can also be used for signalling other information in addition to the power state command. The example of FIGS. 6 to 8 uses only three of the two-bit encodings of the power state command signal lines 30, with the fourth encoding 11 being invalid. In FIG. 12 the 11 encoding is used to represent an information signalling prefix command 56 which can be transmitted following a power up command 50 to indicate that the next batch of commands sent by the first domain 4 represent bits of information rather than a desired sequence of power state transitions. Following transmission of the power signalling prefix command 56, the first domain 4 may then transmit a certain sequence of power up commands 50 and power down commands 54, to represent bits of one and zero respectively. Between successive bits of the sequence, the power state command lines are returned to 0b11 to represent the information signalling prefix command 11, so that the Hamming distance between two successive valid commands is always 1 to protect against incorrect sampling of the commands as discussed above. Each command in the sequence is acknowledged by the second domain 6 before the first domain 4 transitions to the next command. Once the required number of bits have been transmitted, the no-operation command 52 is transmitted after the final power up or power down command 50, 54 to terminate the series of bits, and after the no-operation command 52, the next power up or power down command 50, 54 will be interpreted as instructing a change of power state. In the example of FIG. 12 the power up command 50 is used to signal a bit value of 1 and the power down command 54 used to signal a bit value of 0, but it will be appreciated that other examples could signal bit 0 with the power up command 50 and bit 1 with the power down command 54.

FIG. 13 shows a corresponding state diagram showing transitions between power states and the second domain in the third embodiment. The transitions between the shutdown state 42, active state 40 and standby state 44 are the same as in FIG. 8.

However some additional pseudo power states 70, 72, 74 are provided in FIG. 13 to represent the information signalling states. The pseudo power states 70, 72, 74 have the same power settings as the active state, so are really different versions of the active state (not differing in terms of power consumption), but are shown as separate states in the state diagram for explaining the signalling of information more clearly. When in the pseudo states 70, 72, 74, it is not possible for the first domain 4 to trigger the second domain to switch to the standby state 44 or shutdown state 42 until the second domain has returned to the active state 40 once more (although a reset signal or other external event could cause a transition to the shutdown state or standby state independent of the control provided by the first domain 4). Transitions from the active state 40 to the active (signalling) state 70 are triggered by the information signalling prefix command 56. Transitions from the active (signalling) pseudo state 70 to the bit 1 or bit 0 pseudo states 72, 74 occur in response to the power up and power down commands 50, 54 respectively. Transitions from the bit 1 or bit 0 pseudo states 72, 74 to the active (signalling) pseudo state 70 occur in response to receipt of another information signalling prefix command 56. A return from the bit 1 or bit 0 pseudo states 72, 74 to the active (power up) state 40 is triggered by receipt of a no-operation command 52.

Hence, once the second domain 6 has entered the active state 40 for the first time, the first domain 4 can transmit a series of one or more bits of information using a pattern of power up and power down commands demarcated with information signalling prefix commands 56, and terminated with a final no-operation command 52 which returns the second domain 6 to the main active state 40 to await any subsequent transition to the shutdown or standby states. If several independent binary values are to be transmitted, the no-operation command 52 could be transmitted at the end of one binary value, before transmitting another information signalling prefix command 56 to mark the start of the next binary value. Hence, it is possible to cycle multiple times between the active state 40 and signalling pseudo states 70, 72, 74 before ending the information transmission.

Figure 14:
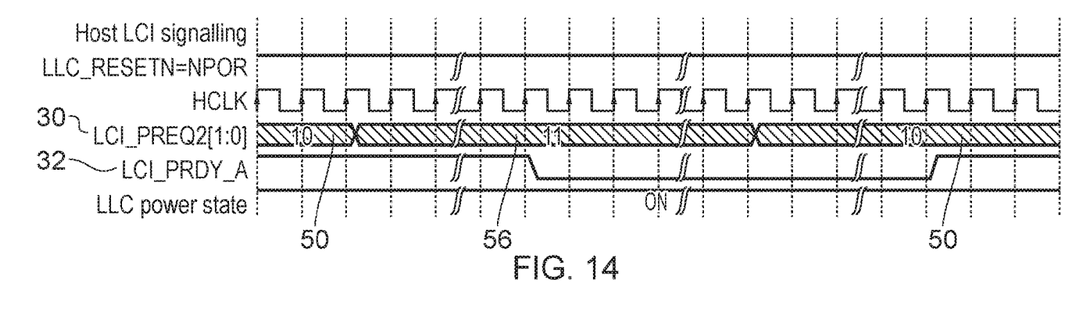
FIG. 14 is a sequencing waveform illustrating an example of the third embodiment.

FIG. 14 shows a waveform illustrating the use of the signalling command. In this example, after powering up the second domain 6, the first domain 4 issues the information prefix signalling command 56 and follows this with a power up command 50 which represents a bit value of 1 for example. Each successive command is acknowledged by the second domain 6 by toggling the acknowledge signal 32, and the first domain defers transmission of the next power state command until it has observed the acknowledgement from the second domain 6.

Figure 15:
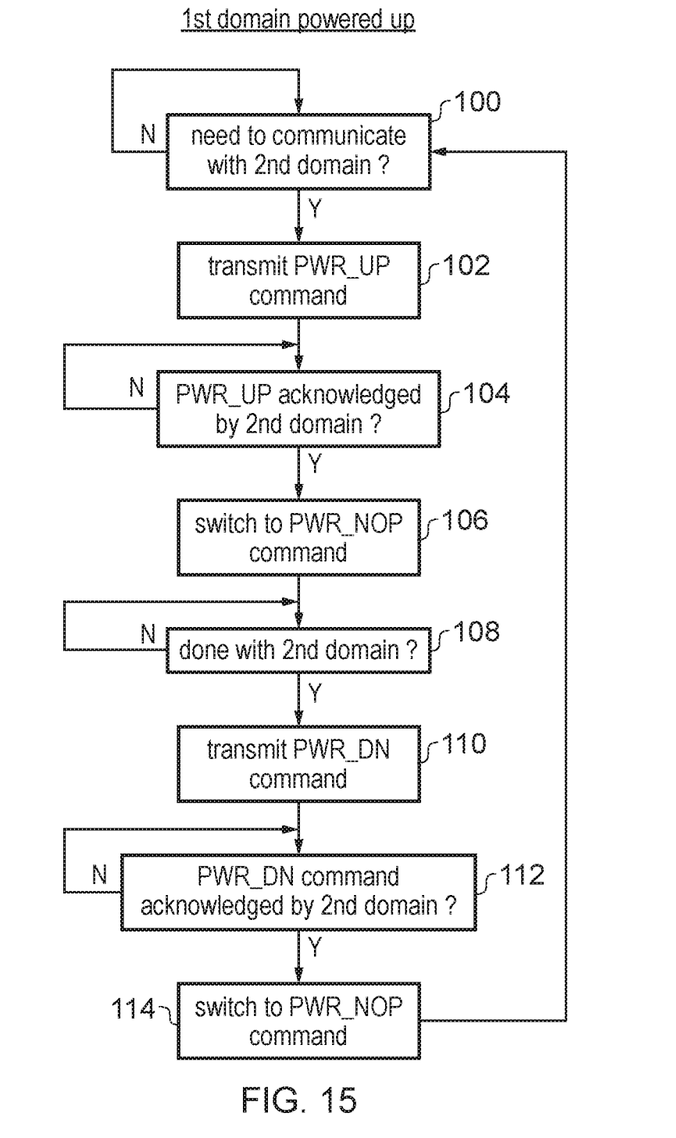
FIG. 15 is a flow diagram illustrating a method of generating power state commands in the first domain.

FIG. 15 is a flow diagram illustrating a method for the first domain 4 to generate power state commands in a state when the first domain is powered up. At step 100 the first domain determines that it needs to communicate with the second domain. At step 102 the first domain transmits a power up command 50 to the second domain 6. At step 104 the first domain 4 determines whether the power up command 50 has been acknowledged by the second domain 6. If not then the method remains at step 104 until the acknowledgement has been received. At step 106, having received the acknowledgement from the second domain, the first domain switches the power state command line 30 to a no-operation command 52, so that on a subsequent change to the power down command, only one bit of the encoding needs to change. At step 108 the first domain determines whether it has finished communicating with the second domain 6, and if not the first domain 6 waits until the communication is no longer required. At step 110, once it is determined that the second domain 6 is no longer needed for communication with the first domain 4, the power down command 54 is transmitted from the first domain 4 to the second domain 6 via the interface 8. At step 112 the first domain determines whether the power down command 54 has been acknowledged by the second domain and if not waits for the acknowledgement.

When the acknowledgement has been received, at step 114 the first domain switches the command signal lines 30 to indicate a power no-operation command 52, again so that a subsequent transition to a power up command would only change one bit. The method then returns to step 100 to await the need for further communication with the second domain 6.

Figure 16:
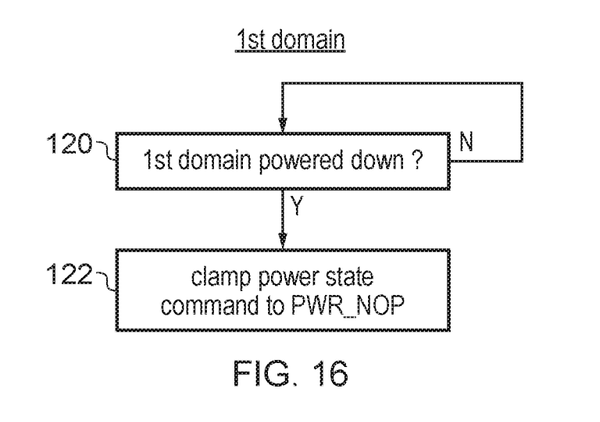
FIG. 16 shows a behaviour at the first domain for clamping the power state command to the no-operation command when the first domain powered down.

FIG. 16 is a flow diagram illustrating clamping of the power command when the first domain 6 is powered down. At step 120 the power controller 14 in the first domain 4 determines whether the first domain is to be powered down, and if not, then waits for such an event. Power down of the first domain could for example occur in response to a reset or in response to a predetermined period of inactivity. When the first domain is to be powered down, then at step 122 the first domain's power controller 14 issues a signal to the interface controller 20 which controls the clamping circuit 40 to clamp the power state command lines 30 to the value corresponding to the no-operation command 52. This ensures that the second domain 6 remains in its current power state regardless of the fact that the first domain is being powered down, to avoid the first domain having to have circuitry for clamping the interface to a value matching the previous state of the second domain.

Figure 17:
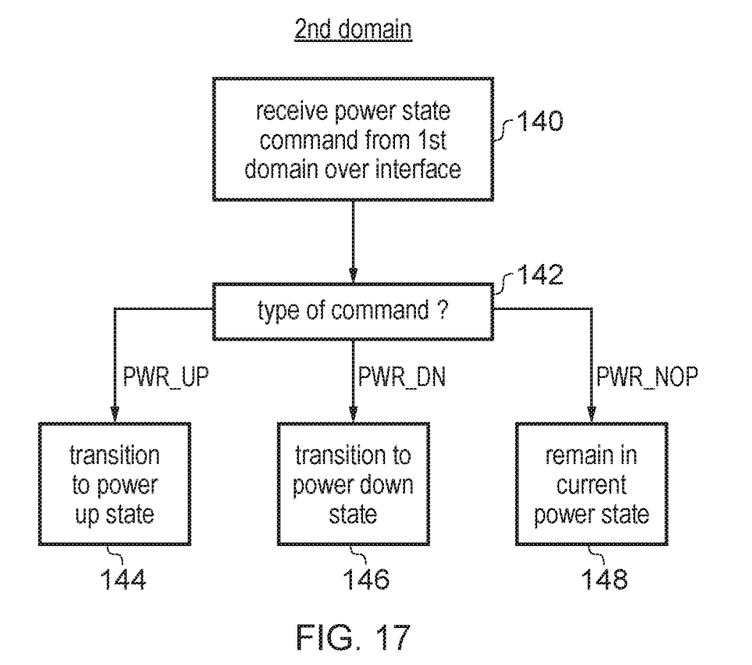
FIG. 17 is a flow diagram illustrating a method of controlling power states in response to the power state commands transmitted from the first domain.

FIG. 17 shows a method of controlling power states at the second domain 6. At step 140 a power state command is received over the interface from the first domain 4. At step 142 the interface controller 22 in the second domain 6 determines the type of command received. If the command is a power up command 50, then at step 144 the power controller 16 in the second domain 6 transitions the second domain to the power up state. If the received command is a power down command 54, then at step 146 the power controller 16 controls the second domain to transition to a power down state. If the command is a no-operation command 52, then at step 148 the power controller 16 retains the second domain 6 in its current power state.

Figure 18:
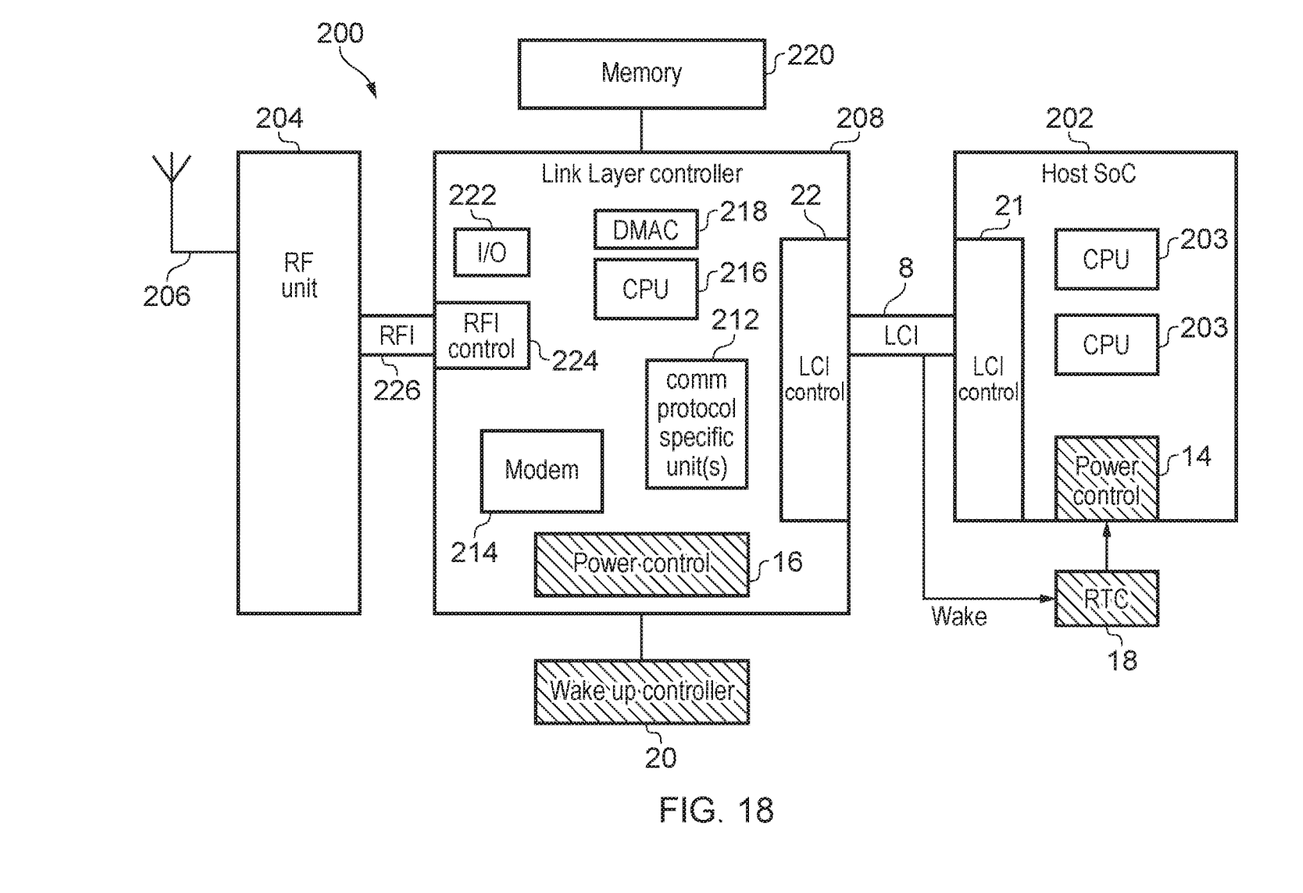
FIG. 18 is a schematic diagram illustrating use of the power control technique in an electronic device having a host system on chip, a radio frequency communication unit; and a link layer controller bridging the host and radio frequency unit.

The technique discussed above can be used in a wide range of fields of electronic systems, however FIG. 18 shows one particular example where the system 200 comprises a host system on chip (SoC) 202 which includes for example a cluster of processors 203. It will be appreciated that the host SoC may include many other components. The host SoC 202 in this example acts as the first domain and has a power controller 14 and interface controller 21 as discussed above. A radio frequency (RF) unit 204 is provided for communicating with external devices by wireless radio signals using an antenna 206. A link layer controller (LLC) 208 is provided between the host SoC 202 and the RF unit 204 to process the signals received from the RF unit and pass corresponding information to the host SoC 202 or control transmission of information from the host SoC 202 via the RF unit 204. By providing the LLC 208 which acts as a bridge between the RF unit 204 and the host SoC 202, any communication protocol specific units 212 can be implemented within the LLC, so that the same design of host system on-chip can be used with a wide variety of communication protocols (e.g. Bluetooth, Zigbee, WiFi, etc.), making system development more efficient. The LLC may include units 212 for two or more communication protocols in the same device. The LLC 208 may include a number of functional circuits, such as a modem 214, processor 216, direct memory access controller 218 for controlling access to memory 220, peripheral input/output controller 222, etc., as well as a radio frequency interface controller 224 for interacting with the radio frequency unit 204. The LLC 208 in this example acts as the second domain 6 and has a power controller 16 and interface controller 22 for controlling the power state and communication over the interface 8 with the host system on-chip 202 in the same way as discussed above for the second domain. The host SoC 202 and LLC 208 may have always-on wake up controllers 18, 20 and power controllers 14, 16 similar to those discussed above. It will be appreciated that this is just one example of a possible system in which the technique can be used.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A system comprising:
   a first domain;
   a second domain; and
   an interface to communicate between the first domain and the second domain;
   wherein the first domain is configured to transmit power state commands to the second domain over the interface, for controlling transitions of the second domain between a plurality of power states including at least a power up state;
   in response to a power up command transmitted by the first domain over the interface, the second domain is configured to transition to the power up state; and
   in response to a no-operation command transmitted by the first domain over the interface, the second domain is configured to remain in a current one of said plurality of power states.

2. The system according to claim 1, wherein the first domain is configured to defer transmission of a subsequent power state command to the second domain until a previous power state command has been acknowledged by the second domain.

3. The system according to claim 1, wherein in response to a power down command transmitted by the first domain over the interface, the second domain is configured to transition to a power down state.

4. The system according to claim 1, wherein the first domain is configured to transmit the no-operation command when the first domain is in a power down state.

5. The system according to claim 1, wherein the first domain comprises clamping circuitry to clamp a subset of signal paths of the interface for transmitting the power state commands to a predetermined value corresponding to said no-operation command when the first domain is in a power down state.

6. The system according to claim 1, comprising a second domain power controller configured to trigger the second domain to operate in the power up state in response to a first predetermined event, independent of the power state commands transmitted from the first domain.

7. The system according to claim 6, wherein the predetermined event comprises one of:
- elapse of a given number of cycles of a clock signal; and
- receipt of a signal from an external device.

8. The system according to claim 1, comprising a first domain power controller to trigger the first domain to transition to a power down state, independent of a current power state of the second domain.

9. The system according to claim 8, wherein the first domain power controller is configured to trigger the first domain to transition to a power up state in response to a second predetermined event.

10. The system according to claim 9, wherein the second predetermined event comprises one of:
- elapse of a given number of cycles of a clock signal; and
- receipt of a first domain wakeup signal from the second domain.

11. The system according to claim 1, wherein in response to the no-operation command when the second domain is currently in the power up state, the second domain is configured to remain in the power up state; and
- in response to the no-operation command when the second domain is currently in a power down state, the second domain is configured to remain in the power down state.

12. The system according to claim 1, wherein the no-operation command has a different encoding to the power up command.

13. The system according to claim 1, wherein the power state commands are encoded as an N-bit signal where N is an integer greater than or equal to 2.

14. The system according to claim 1, wherein the first domain is configured to transmit at least one bit of information to the second domain using a subset of signal paths of the interface used for transmitting the power state commands.

15. The system according to claim 1, wherein in response to receipt of an information signalling prefix command over the interface following receipt of said power up command, the second domain is configured to interpret one or more following power state commands received from the first domain as representing at least one bit of information transmitted from the first domain to the second domain, instead of triggering transitions between the power states in response to said one or more following power state commands.

16. The system according to claim 15, wherein said one or more following power state commands comprise one or more power state commands received between receipt of said information signalling prefix command and receipt of a no-operation command.

17. The system according to claim 1, wherein the first domain comprises a host system, and the second domain comprises a wireless subsystem to control wireless communication between the host system and an external device.

18. A first domain for transmitting, over an interface, power state commands for controlling transitions of a second domain between a plurality of power states including at least a power up state;
- the first domain comprising control circuitry to:
- control transmission of a power up command over the interface to control the second domain to transition to the power up state; and
- control transmission of a no-operation command over the interface to control the second domain to remain in a current one of said plurality of power states.

19. A second domain comprising:
- control circuitry to control transitions of the second domain between a plurality of power states in response to power state commands received from a first domain over an interface, the plurality of power states including at least a power up state;
- wherein in response to a power up command transmitted by the first domain over the interface, the control circuitry is configured to control the second domain to transition to the power up state; and
- in response to a no-operation command transmitted by the first domain over the interface, the control circuitry is configured to control the second domain to remain in a current one of said plurality of power states.

20. A method comprising:
- transmitting power state commands over an interface from a first domain to a second domain; and
- controlling transitions of the second domain between a plurality of power states including at least a power up state, in dependence on the power state commands;
- wherein in response to a power up command transmitted by the first domain over the interface, the second domain transitions to the power up state; and
- in response to a no-operation command transmitted by the first domain over the interface, the second domain remains in a current one of said plurality of power states.

* * * * *